C. M. CHAMBERLAIN.
FILTERING APPARATUS.
APPLICATION FILED JULY 22, 1909.
959,461.
Patented May 31, 1910.
2 SHEETS—SHEET 1.
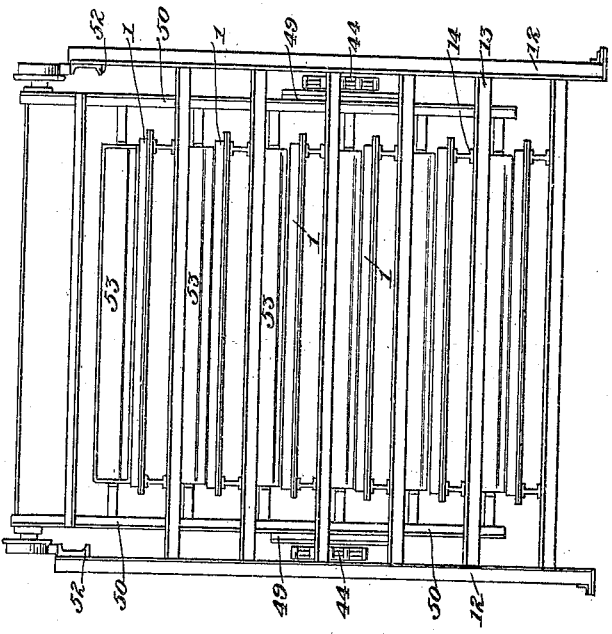
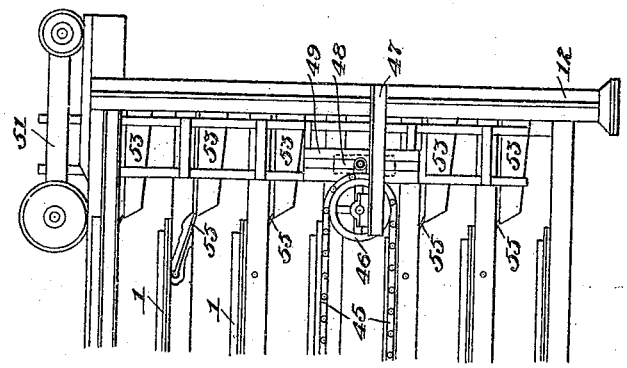
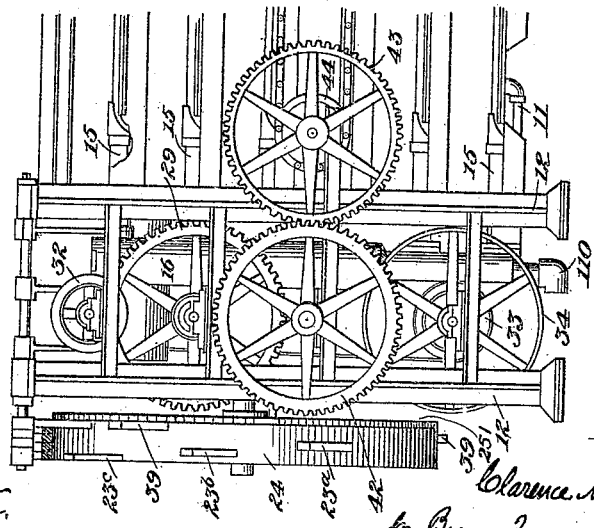
Witnesses:
E. Daniels
C. H. Potter
Inventor:
Clarence M. Chamberlain
by Byrnes Townsend & Brickenstein
Attys.

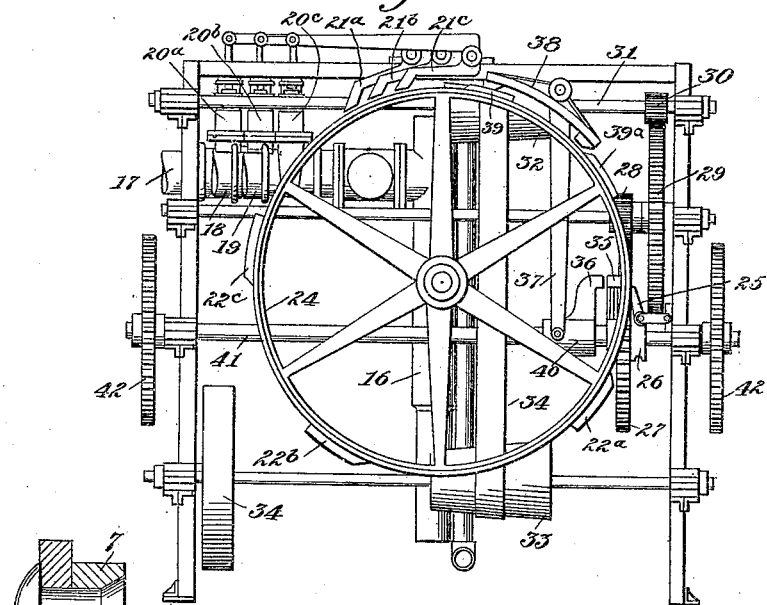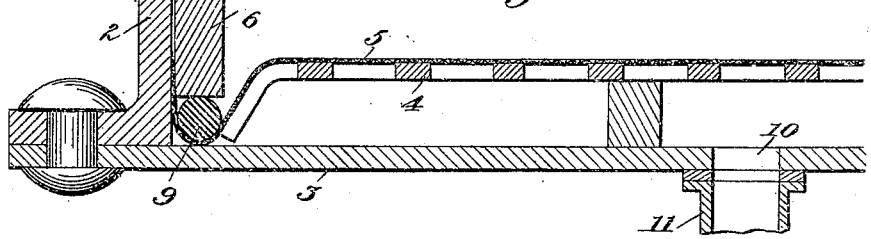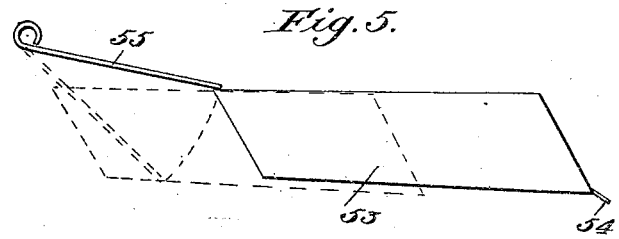

UNITED STATES PATENT OFFICE.

CLARENCE MERTON CHAMBERLAIN, OF DENVER, COLORADO.

FILTERING APPARATUS.

959,461.  Specification of Letters Patent.  Patented May 31, 1910.

Application filed July 22, 1909. Serial No. 508,894.

*To all whom it may concern:*

Be it known that I, CLARENCE MERTON CHAMBERLAIN, a citizen of the United States, residing at Denver, in the county of Denver and State of Colorado, have invented certain new and useful Improvements in Filtering Apparatus, of which the following is a specification.

My invention relates to a filtering process and apparatus in which a series of filters is provided with automatically operated mechanism for charging and discharging the filters, and for enabling the material on such filters to be subjected to the desired treatment. The process and apparatus are primarily designed for the separation of liquid from crushed ores, slimes or other metalliferous material, but is adapted for use in many other relations.

My invention will be best understood by reference to the accompanying drawings, in which:—

Figure 1 is a view in elevation, the central portion being cut away; Fig. 2 is a view of the right-hand end of the apparatus as shown in Fig. 1, Fig. 3 is an elevation of the left-hand end of the apparatus, illustrating the automatic control mechanism, Fig. 4 is a sectional elevation, showing the details of filter construction on an enlarged scale, and Fig. 5 shows the pan and discharging plate on an enlarged scale.

Referring more particularly to the drawings, the construction of the apparatus will be described in detail.

The filters 1, shown diagrammatically only in Figs. 1 and 2, but in detail in Fig. 4, are shallow, rectangular, open-topped trays, preferably of sheet metal, having sides 2 of angle-irons riveted to the bottoms 3. Located within the trays are perforated screens 4, supported by spacing bars 3, the filter cloth 5 being carried on the screen. Clamping bars 6 fit, on each side of the tray under the beveled edges of a series of lugs 7, secured to the sides of the tray by bolts or rivets 8. Round rubber packings 9, under the bars 6, which are grooved on their under sides, serve to hold the edges of the filter cloth in place. To insert a filter-cloth, it is spread smoothly over the screen and against the side of the tray, the rubber packings are put in place, the clamping bar is pressed down on the packing until it will slip under the beveled edge of the lug 7, and then pushed into place, as shown, where it is held by the elasticity of the packing. Suitable openings 10, connected to exit-pipes 11, permit the liquid to be withdrawn, the pipes 11 being connected to a suction manifold 110, which is connected to a suitable exhaust pump, if desired. A series of these filter trays 1 are mounted on a supporting frame (Figs. 1 and 2) comprising uprights 12, horizontal cross-beams 13, and longitudinal beams 14. The material to be filtered is delivered onto each filter from pipes 15, connected to a common supply-chamber 16, which is in turn connected to a series of delivery pipes 17, 18, 19, for furnishing materials to be filtered, wash water, cyanid solutions, etc., as may be required. Valves $20^a$, $20^b$, $20^c$, in these pipes are connected to and operated by a corresponding series of levers $21^a$, $21^b$, $21^c$. The ends of these levers are engaged by cams $23^a$, $23^b$, $23^c$, on a time-wheel 24, which is given a step-by-step movement by a pawl 25, engaging a ratchet-wheel 251, on the wheel 24. This pawl is operated by a cam-wheel 26 mounted in a gear-wheel 27, which is part of a train of wheels 28, 29, 30, the last wheel being mounted on a shaft 31 carrying the upper one of a pair of cone pulleys 32, 33, connected by a belt 34, the lower cone-pulley 33 being mounted on the shaft of the power-driven pulley 34.

Carried by the wheel 27, is one member 35, of a clutch, the coöperating member 36 being mounted on a sleeve 40, which is reciprocated by an arm 37 carried by a pivotally mounted rocker-arm 38, the ends of which have projections engaging cams 39 on the time-wheel 24. The sleeve 40 is splined onto a shaft 41, mounted transversely of the frame, and carrying at its ends gear-wheels 42, which engage gear-wheels 43, having secured to their shafts sprocket-wheel 44, for driving sprocket-chains 45, which pass also over sprocket-wheels 46, mounted on brackets 47 carried by the end standards 12.

Pivotally attached to one of the links of each chain 45, are blocks 48, arranged to slide in grooved plates 49, these plates being secured to the uprights 50 of a framework which depends from a wheeled truck 51, arranged to run on tracks 52, carried by the main frame. Mounted on this truck-frame are a number of pans 53, the bottoms of the open ends being turned down as at 54, to cause the material deposited on the filter cloth to slide up into the pans, as they are pulled along over the filter trays.

55 is a clearing plate pivoted, as shown in Figs. 1 and 5, to the frame-work over the discharge end of each filter tray, so that as the pans move from left to right, the clearing plate will be lifted, as shown in full lines in Fig. 5, and will then as the frame begins its reverse movement drop down into the dotted line position and push off the accumulated material.

The operation of the apparatus is as follows: The power being applied and the suction pump started, the cam $23^c$ on the time-wheel 24 will open the valve $20^c$ thereby admitting through the supply chamber 16 and pipes 15 a charge of material which flows over the upper surface of the filter beds, the liquid being withdrawn through the filter-cloth by the suction through pipes 11. Further revolution of the time-wheel will successively open and close the valves $20^b$, $20^a$, and admit to the filter beds at proper intervals successive charges of material, one charge having its liquid contents substantially withdrawn before the next charge is distributed over the filters. While, for convenience of illustration three valves only have been shown, more may be used if desired. The last valve opened admits the washing water to finish the treatment. The cam or lug 39 will then throw in the clutch 35, 36, and thereby get in motion the chain 45, which will cause the truck 51 to move from left to right carrying with it the pans 53 which will gather up the residue and carry it to the tail end of the filter. As the pans begin their return movement, the discharge plates 55 having dropped in behind the load in the pans 53, push them off. When the truck has returned to the head end, a properly located lug or cam $39^a$ on the time-wheel will throw out the clutch and the truck and its pans will remain stationary until it is time for the cleaning operation to be repeated. The entire filtration is thus, it will be seen, automatically conducted, and the services of attendants substantially dispensed with.

I claim:

1. In a filtering mechanism, the combination of a plurality of trays, each tray containing a filter bed which divides it into an upper and lower compartment, a common filling chamber, and conduits connecting each upper compartment with such chamber.

2. In a filter mechanism, the combination of a plurality of trays, each tray containing a filter bed which divides it into an upper and lower compartment, a common filling chamber, one or more conduits connecting each upper compartment with such chamber, and conduits arranged to connect the lower compartments with a suction apparatus.

3. In a filter mechanism, the combination of a plurality of trays, each tray containing a filter bed which divides the tray into an upper and lower compartment, and conduits arranged to connect the lower compartments with a suction apparatus.

4. The combination with a vertically arranged series of filters, of means for supplying the material thereto, and automatic mechanism for operating such means at proper intervals.

5. The combination with a vertically arranged series of filters, of means for supplying material thereto, means for discharging the residues therefrom, and automatic means for operating such supply and discharge means at proper intervals.

6. The combination with a filter, of a series of valved pipes arranged to deliver material to the filter, and a mechanism constructed and arranged to open and close the valves in proper order.

7. The combination with a filter, of a series of valved pipes arranged to deliver material to the filter, a mechanism comprising a cam-wheel provided with lugs or cams, and operating bars connected with the valves and arranged to be operated by the lugs or cams.

8. The combination with a filter of a series of valved pipes arranged to deliver material to the filter, means for discharging the residue, and a mechanism constructed and arranged to open and close the valves and operate the discharging mechanism in proper order.

9. In a filter mechanism, the combination of a plurality of filters, a common supply chamber therefor, conduits connecting the filters and the supply chamber, valved conduits for delivering material to the supply chamber, and an automatic time mechanism constructed and arranged to operate the valves in proper order.

10. The combination of a plurality of filters, a common supply chamber therefor, conduits connecting the filters and the supply chamber, valved conduits for delivering material to the supply chamber, means for discharging the residue from the filter, and an automatic mechanism for operating the valves and discharge mechanism in proper order.

11. In a filtering mechanism, the combination of a plurality of open top filters arranged one above the other, and means for delivering thereto materials to be filtered.

12. In a filtering mechanism, the combination with an open top filter, of a discharging pan, and power actuated means for moving the pan lengthwise of the filter.

13. In a filtering mechanism, the combination with an open top filter, of a discharging pan, power actuated means for moving the pan lengthwise of the filter, and means for unloading the pan.

14. In a filtering mechanism, the combination with an open top filter, of a discharging pan, power actuated means for moving the pan lengthwise of the filter, and a depending plate arranged to unload the pan.

15. In a filtering mechanism, the combination of an open top filter, a discharging pan, a truck on which the pan is carried, and means for moving the truck lengthwise of the filter.

16. In a filtering mechanism, the combination of a series of horizontally disposed open top filters, a truck having a depending frame, discharging pans carried by said frame and arranged to move over the filter surfaces, and means for reciprocating the truck.

17. In a filtering mechanism, the combination of a series of horizontally disposed open top filters, a truck having a depending frame, discharging pans carried by said frame and arranged to move over the filter surfaces, and means for reciprocating the truck, comprising an endless chain connected to the truck and means for driving the same.

18. A filter tray having therein a perforated screen supported above the bottom thereof, a filter cloth on said screen, lugs on the sides of the tray, a resilient packing arranged over the edge of the filter cloth, and clamping bars engaging the lugs and the packing.

In testimony whereof, I affix my signature in presence of two witnesses.

CLARENCE MERTON CHAMBERLAIN.

Witnesses:
O. F. COOLEY,
HORACE ALDEN.